United States Patent
Hooper, Jr.

[11] Patent Number: 5,277,956
[45] Date of Patent: Jan. 11, 1994

[54] ENHANCED REINFORCED HONEYCOMB STRUCTURE

[75] Inventor: James R. Hooper, Jr., Palmdale, Calif.

[73] Assignee: The United States of America as represented by the Secretary of the Air Force, Washington, D.C.

[21] Appl. No.: 827,653

[22] Filed: Jan. 29, 1992

[51] Int. Cl.$^5$ ............................................. B32B 3/12
[52] U.S. Cl. .................................... 428/102; 52/806; 428/116; 493/966
[58] Field of Search ................. 428/102, 116, 118; 156/292; 493/966; 52/806

[56] References Cited

U.S. PATENT DOCUMENTS

| | | | |
|---|---|---|---|
| H47 | 4/1986 | Monib | 428/116 |
| 488,869 | 12/1892 | Cabot | 428/102 |
| 2,694,025 | 11/1954 | Slayter et al. | 428/102 |
| 2,726,977 | 12/1955 | See et al. | 428/138 |
| 3,142,885 | 8/1964 | Capel | 428/37 |
| 3,579,411 | 5/1971 | Mackie et al. | 428/102 |
| 3,847,719 | 11/1974 | Crowley | 428/89 |
| 3,960,236 | 6/1976 | Holmes | 428/102 X |
| 4,144,612 | 3/1979 | Yamaguchi | 15/208 |
| 4,168,197 | 9/1979 | Michimae et al. | 156/283 |
| 4,206,895 | 6/1980 | Olez | 428/116 X |
| 4,331,495 | 5/1982 | Lackman et al. | 156/93 |
| 4,426,414 | 1/1984 | Wilkerson | 428/102 |
| 4,464,429 | 8/1984 | Michaud-Soret | 428/117 |
| 4,622,091 | 11/1986 | Letterman | 156/286 |
| 4,685,986 | 8/1987 | Anderson | 428/116 X |
| 4,786,343 | 11/1988 | Hertzberg | 156/93 |

*Primary Examiner*—Henry F. Epstein
*Attorney, Agent, or Firm*—Stanton E. Collier

[57] ABSTRACT

An enhanced reinforced honeycomb structure is provided when at least one thread is stitched in a given pattern along each linear group of cells in the honeycomb structure. This reinforcement reduces the weight of the attached panels since additional structural strength is provided by the threads in the honeycomb structure.

4 Claims, 1 Drawing Sheet

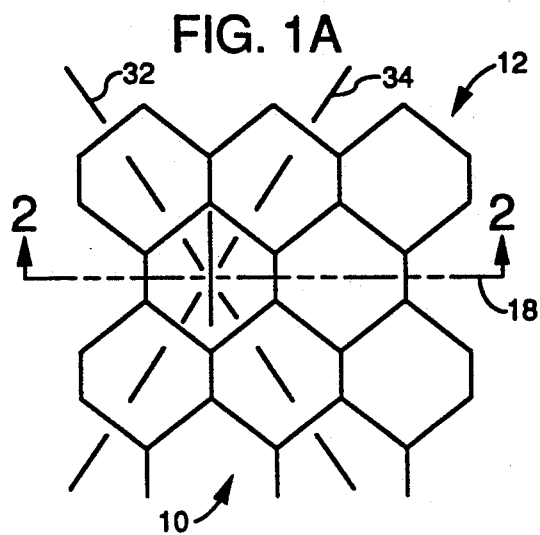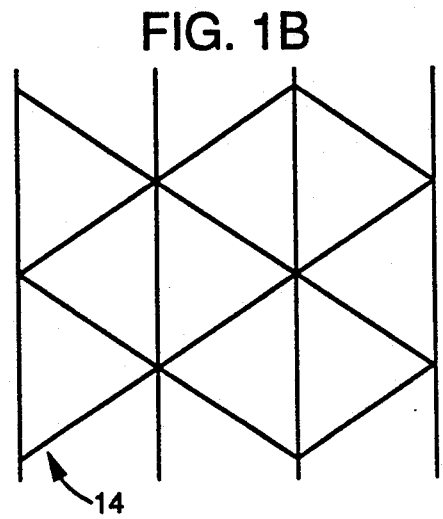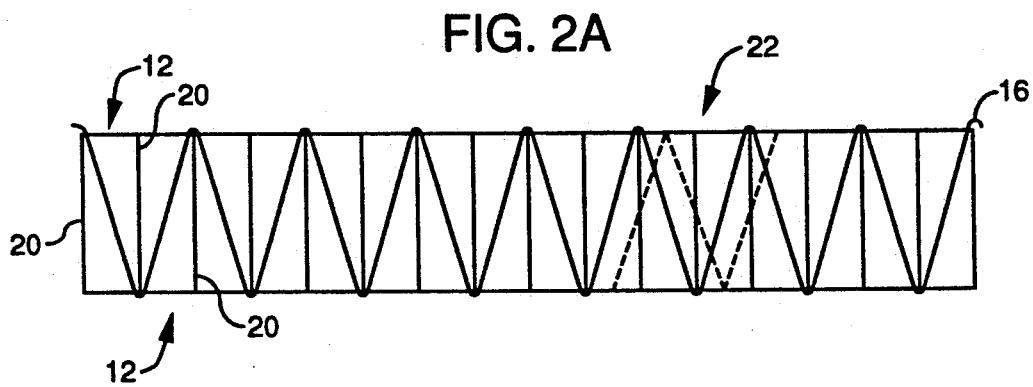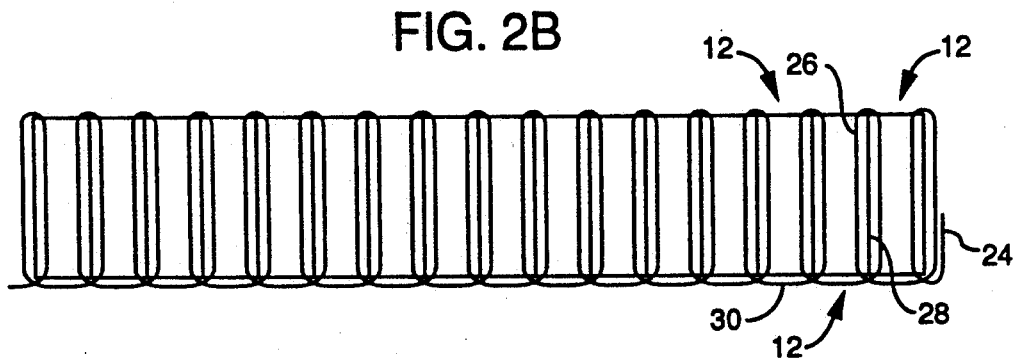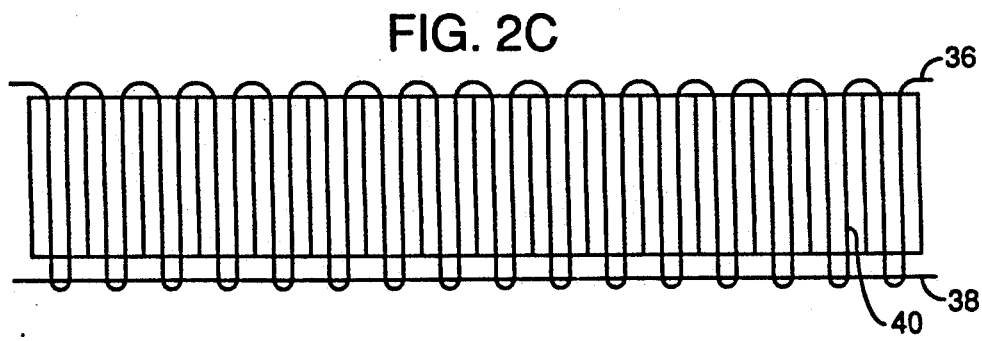

ENHANCED REINFORCED HONEYCOMB STRUCTURE

STATEMENT OF GOVERNMENT INTEREST

The invention described herein may be manufactured and used by or for the Government for governmental purposes without the payment of any royalty thereon.

BACKGROUND OF THE INVENTION

The present invention relates to honeycomb structures, and, in particular, relates to a means of reinforcing the honeycomb structure.

A prior method of reinforcement is shown in U.S. Pat. No. 3,579,411 that discloses in the Figures a pair of panels held apart by a fixture. In this configuration, various styles of stitching are used in combination such as a straight stitch, a slant stitch and a lock stitch, etc. to provide additional strength. The fixture can be removed or left in place. A coating of resin is applied thereto. After hardening, the interior threads would act as braces, struts, trusses or other reinforcements. The fixture shown is composed of orthogonal upper and lower fingers which can be easily removed to provide a pair of panels held apart by the resined thread reinforcements. It is seen in this patent that the threads are integrally connected to the exterior panels. The above patent is incorporated by reference.

Therefore, there is a need to provide a means to reinforce a pre-existing structure without exterior panels thereon.

SUMMARY OF THE INVENTION

The present invention provides for an enhanced reinforcement of honeycomb structures.

The honeycomb structures of the present invention is composed of a plurality of similarly shaped cells attached to one another. The vertical walls are shared by adjoining cells. This honeycomb structure initially has no exterior panels thereon but these can be added later during manufacturing of the desired product.

A variety of stitch styles such as straight, loop and lock are used in the reinforcement. Each cell would have at least one internal thread therein, preferrably two. Exterior threads would connect to these internal threads. The threads would be resin treated in a conventional manner to rigidize themselves within the honeycomb structure. After this exterior panels can be attached. The cells of the structure are grouped in a linear manner which provides the direction of stitching. More than one style of stitching can be used in one structure to further enhance strength.

Therefore, one object of the present invention is to provide an enhanced reinforcement to the honeycomb structure.

Another object of the present invention is to provide an enhanced reinforced honeycomb structure having at least one stitch style therein.

Another object of the present invention is to provide an enhanced reinforced honeycomb structure which reduces the weight of the attached panels that would normally provide strength.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIGS. 1A and 1B illustrate by top view several conventional honeycomb structures.

FIGS. 2A, 2B, and 2C illustrate by side view cross section various stitch styles used in the honeycomb structures of FIG. 1.

DETAILED DESCRIPTION OF THE PREFERRED EMBODIMENT

Referring to FIG. 1A, a top view of a honeycomb structure 10 is shown being of conventional design having a plurality of similar cells 12 therein. Each cell 12 shares common walls with adjacent cells 12. The cells 12 are of hexagonal shape while the cells 14 of FIG. 1B are of triangular shape. Other shapes are clearly appropriate for use by the present invention.

For example, the honeycomb structure 10 may be made of MPD-I paper. Such honeycomb structures are available commercially from Hexcel Corporation, Dublin, Calif. (e.g., HRH-10 aramid fiber reinforced honeycomb having an average cell size of about 3.2 mm and a nominal density of about 0.05 g/cm$^3$. Of course, the size of the cells, the density, the overall dimensions and the strength and stiffness characteristics of the structure can vary considerably depending on the intended use of the product.

In order to further detail the present invention a cross section 2—2 of FIG. 1A is shown in FIG. 2 with various stitch styles therein.

In FIG. 2A, a thread 16, using a straight stitch style, is passed from each cell 12 to the next cell 12 in a straight line 18 of a horizontal linear group along that line 18. A linear group is a group of similar shaped cells along a line passing through those cells. In the honeycomb structure, there are parallel linear groups. In any given honeycomb structure, the cells may be grouped in several different linear groups. In FIG. 1A, there are three different linear groups along the lines shown. In so doing the thread 16 forms a truss pattern between the cells using the adjoining walls 20 as vertical supports. Each parallel linear group of cells 12 can be so stitched and to provide further strength, the threads 16 would alternate in direction between vertical cells in FIG. 1A so that when viewed from the side an "x" pattern would be as shown partially in FIG. 2A at area 22.

In FIG. 2B, a thread 24 is shown in a loop stitch style with a loop 26 about each adjoining wall 28. It should be noted that a connecting thread 30 between each loop 26 is shown on the bottom. As seen in FIG. 1A, each adjacent row of cells 12 could have the connected thread 30 on the opposite side of the honeycomb structure 10.

Referring to FIG. 1A, it should also be noted that thread 24 could traverse the lines 32 and 34 in a similar manner. Thus, each cell 12 could have three connecting threads thereon.

Referring to FIG. 2C, a third stitch style, lock stitch, is shown. A thread 36 traverses each cell 12 twice and at similar ends has a lock thread 38 pass through a loop 40 of the thread 36.

The thread 36 can be placed along lines 18, 32 and 34 to develop additional strength. Further the lock thread 38 can be placed on opposite sides for adjacent parallel cells producing additional truss patterns.

After the threads are applied as noted above in the honeycomb structure 10, the threads may be rigidized by the application thereto of a thread enveloping or permeating coating. This coating may be thermosetting or thermoplastic in nature or may otherwise be caused to set so that, when hardened, it encapsulates the threads in a sheath of rigid material. When hard this sheath will have substantial compressive strength which will vary in degree depending upon the characteristics of the coating material selected. It will be apparent that where the thread selected is porous or can be permeated by the coating material an even stronger thread to coating bond can be assured.

The coating material may be of many types. Suitable thermosetting resins include phenolic, polyester, epoxy and urethane resin. In addition to being thermosetting or thermoplastic the resin may incorporate a catalyst or otherwise may be so constituted as to cure at room temperature. Thermoplastic resins may be acrylics, vinyls, polystyrenes and cellulosics and may be appropriately selected to withstand ambient conditions of temperature, moisture, etc. to be expected in the panel's ultimate environment. In addition, the plastics may be of the polyamide type which rigidize upon exposure to air, or they may remain fluid until fixed with other substances such as polyisobutylene and polyethylene or boron fluoride. Whichever coating material is selected, an appropriate rigidizing technique is employed to render it hard and firm so as to impart the necessary rigidity and compressive strength to the threads.

When metal threads are employed the coating may be a brazing material such as a brazing slurry, or there may be used a plating or dipping process by which a sheath of coating material is placed about the threads. Also a spray can be utilized to distribute this coating.

Clearly, many modifications and variations of the present invention are possible in light of the above teachings and it is therefore understood, that within the inventive scope of the inventive concept, the invention may be practiced otherwise than specifically claimed.

What is claimed is:

1. An enhanced reinforced honeycomb structure, said enhanced reinforced honeycomb structure comprising:
   a honeycomb structure having a plurality of similarly shaped cells sharing common walls with adjoining cells, each of said cells having an open top and open bottom end, each of said cells having a void between the top and bottom end, said cells being arranged in linear groups;
   means for enhanced reinforcement, said means comprising:
   at least one thread communicating from the top to the bottom end through the void of each cell, said thread running along a linear group of cells, said thread touching at least one top edge of the walls of the common cells; and
   means for rigidizing the honeycomb structure, said means for rigidizing being a coating on each thread to form a solid rod, said means for rigidizing not filling the void of each cell.

2. An enhanced reinforced honeycomb structure as defined in claim 1 wherein each cell has 3, 4, or 6 walls.

3. An enhanced reinforced honeycomb structure as defined in claim 2 wherein each cell has 6 walls and each cell as 1, 2 or 3 threads therein.

4. An enhanced reinforced honeycomb structure as defined in claim 1 wherein each thread can define a stitching pattern selected from the group consisting of straight stitch, loop stitch and lock stitch, each thread communicating across the void of each cell changing direction after contacting a top edge of each cell.

* * * * *